April 1, 1969      G. E. LEHMANN      3,436,119
COMBINATION ICE FISHING CHAIR AND SLED
Filed July 21, 1967
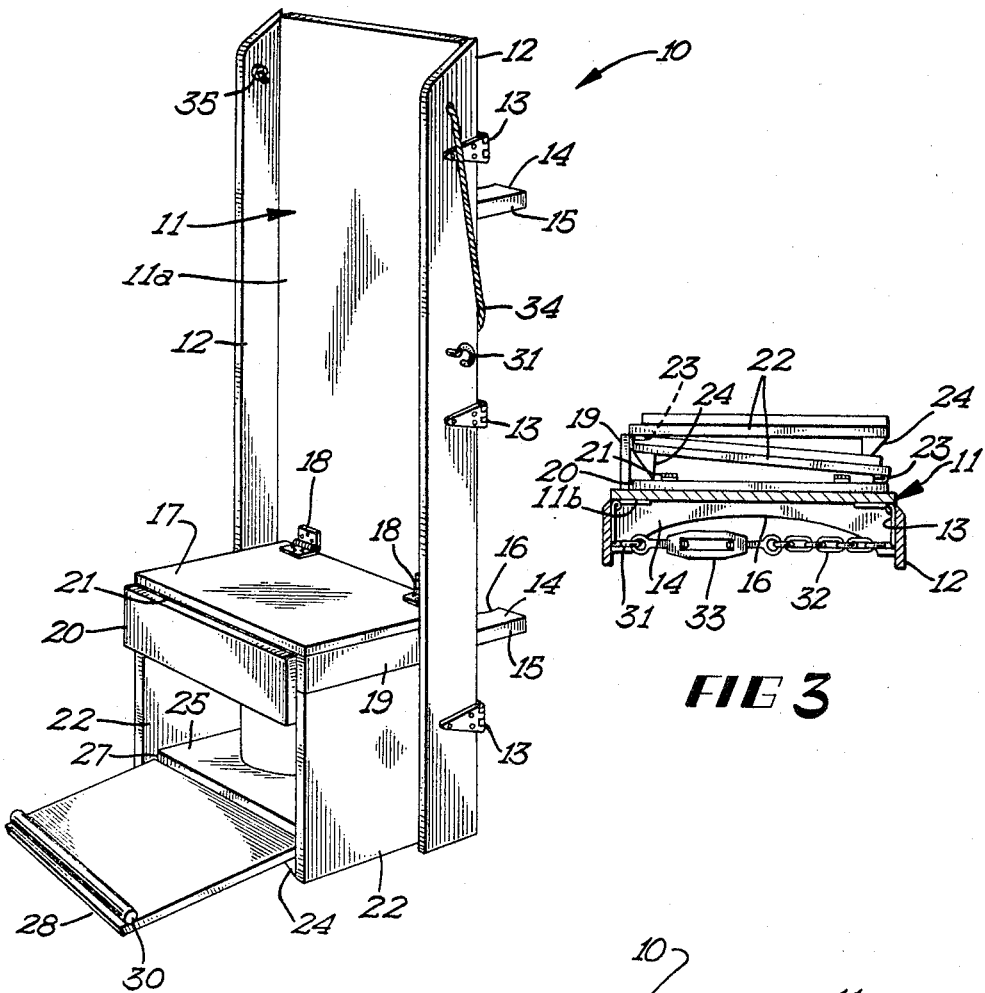
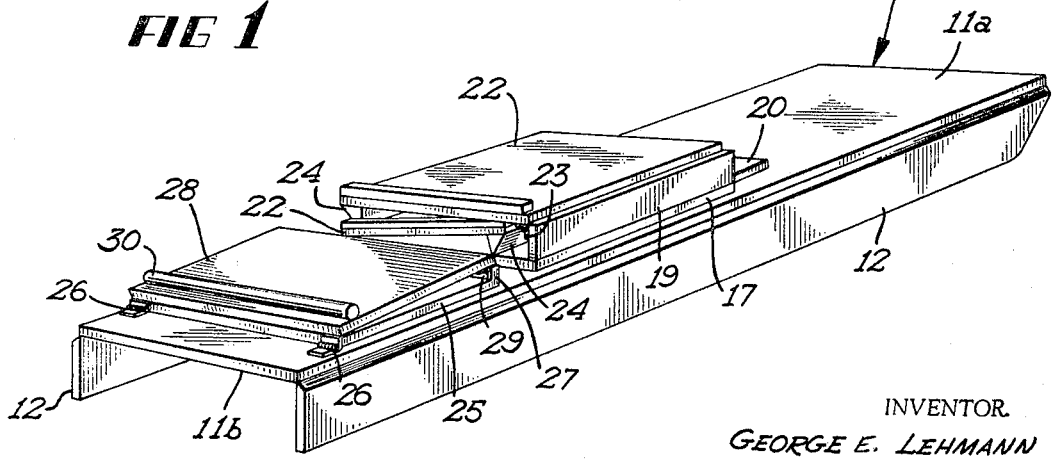
INVENTOR.
GEORGE E. LEHMANN
BY
Williamson, Palmatier
& Bains ATTORNEYS

United States Patent Office 3,436,119
Patented Apr. 1, 1969

3,436,119
COMBINATION ICE FISHING CHAIR AND SLED
George E. Lehmann, Box 154, Ceylon, Minn. 56121
Filed July 21, 1967, Ser. No. 655,030
Int. Cl. A47c 7/00, 31/00, 13/00; A47d 1/04;
B62b 15/00, 17/00, 13/00
U.S. Cl. 297—217                                                5 Claims

ABSTRACT OF THE DISCLOSURE

A combination ice fishing chair and sled device, including a backrest member having a seat member and a pair of seat support members hingedly connected with the backrest member. A pair of wing members hingedly connected to the back member and serving as side protectors when the device is used as a chair, and serving as runners when the device is used as a sled. A floor member hinged to the backrest member and a footrest member hinged to the floor member. The seat, seat support, floor, and footrest members all being collapsible to lie upon the backrest member when the device is used as a sled.

---

This invention relates to a collapsible ice fishing chair, which may be readily collapsed to form a sled.

An object of this invention is to provide a collapsible ice fishing chair, of simple and inexpensive construction, which may be readily collapsed to form a sled to facilitate transport of the chair over snow and ice.

Another object of this invention is to provide a collapsible ice fishing chair including a backrest having a pair of wing elements hingedly secured thereto which function as sled runners when the chair is collapsed to form a sled, and including seat and seat support members hinged to the backrest and cooperating with a hinged floor to provide a seat having a compartment thereunder, in which may be positioned a lamp or other heating medium to provide warmth for the fisherman when the ice fishing chair is in the erect condition.

These and other objects and advantages of this invention will more fully appear from the following description made in connection with the accompanying drawings wherein like reference characters refer to the same or similar parts throughout the several views, and in which:

FIG. 1 is a front perspective view of the ice fishing chair in the erect position;

FIG. 2 is a perspective view of the ice fishing chair in the collapsed position when it is used as a sled; and FIG. 3 is a transverse cross-sectional view of the collapsible ice fishing chair when it is in the collapsed position illustrating the interrelation of certain parts thereof when in a collapsed condition.

Referring now to the drawings, and more specifically to FIG. 1, it will be seen that one embodiment of the collapsible ice fishing chair, designated generally by the reference numeral 10 is there shown. The ice fishing chair includes a rectangular-shaped backrest member 11, having a substantially flat front surface 11a and a substantially flat back surface 11b. A pair of generally elongate rectangular-shaped flat wing elements 12 are hingedly connected to the backrest member 11 by a plurality of hinges 13. It will be noted that these wing elements 12 each have a longitudinal dimension corresponding to the longitudinal dimension of the backrest member. The respective upper end edges of these wing elements 12 are inclined since these wing elements serve as runners when the chair is in the collapsed position, and these inclined end edges constitute the leading or front end of the runners.

A pair of longitudinally spaced apart similar transverse stop elements 14 are fixedly secured to the rear surface 11b of the backrest member and project rearwardly therefrom. It will be noted that these transverse stop elements have parallel end edge surfaces 15, which are substantially coplanar with the longitudinal edges of the backrest member. Although the longitudinal surface of each transverse stop element 14, which is positioned in engaging relation with the backrest member is substantially straight, each transverse stop element also has an outer or lower arcuate longitudinal surface 16. The end edges constitute the leading or front ends of the ward swinging movement of the wing elements 12 when the latter are swung to a collapsed or sled defining position.

A substantially flat, generally rectangular-shaped seat member 17 is hingedly connected to the front surface 11a of the backrest member intermediate the ends of the latter by hinges 18 to permit swinging movement of the seat member about an axis extending transversely of the backrest member. A rectangular-shaped side seat element 19 is fixedly secured to the lower surface of the seat member 17 adjacent one longitudinal edge thereof and depends therefrom, when the seat member 17 is in the chair forming condition. A substantially rectangular-shaped front seat element 20 is hingedly connected to the seat member 17 adjacent the front longitudinal edge thereof by suitable hinges 21.

A pair of generally rectangular-shaped seat support members 22 are each hingedly connected to the seat member 11 by suitable hinges 23. Actually one of the seat support members 22 is hinged to the side seat element 19 while the other seat support member is hinged directly to seat member 17. Each seat support member 22 projects forwardly from the backrest member 11 when in the erect chair forming condition. One of these seat support members 22 has its upper edge engaged by the lower edge of the side seat element 19, while the upper edge of the other seat support member is engaged by the lower edge of the seat member 17. The front seat element 20 overlies that seat support member 22 which engages the seat member 12, but does not overlie the seat support member 22, which is engaged by the side seat element 19.

A generally rectangular-shaped flat floor member 25 is hingedly connected to the front surface 11a of backrest member 11 adjacent the lower end thereof by suitable hinges 26 to permit swinging movement of the floor member about an axis substantially parallel to the axis of pivot of the seat member 17. It will be noted, that the floor member 25 is spaced downwardly from and substantially parallel to the seat member 17 when the floor member is in the chair forming condition. Marginal edges of the floor member 25 engage and are supported by a pair of elongate similar support elements 24, each being secured to one of the seat support members 22 adjacent the lower edge portion thereof. The floor member 25 cooperates with the backrest member 11, seat member 17 and seat support members 22 to define a forwardly opening compartment in which a suitable heating device, such as the lamp L is positioned, to provide warmth for a user. In this regard, it is pointed out that the lower surface of the seat member 17 may be provided with a suitable insulating material, such as asbestos or the like.

A substantially rectangular-shaped flat footrest member 28 is hingedly connected to the floor member 25 adjacent the front marginal edge of the latter by suitable hinges 29. Thus, the footrest member 28 is also swingable about an axis disposed substantially parallel to the pivotal axis of the floor member and the seat member 17. It will be noted, that the footrest member 28 projects forwardly of the floor member 25 when in the erect condition and extends slightly downwardly therefrom. The footrest member 28 is limited in its pivotal swinging movement to the erect or extended condition by downturned lip or element 27, which is integrally formed with the floor member 25 and extends transversely of the front marginal edge portion of the footrest member throughout the width of the latter. The footrest member has an upwardly projecting retaining element 20 fixedly secured to the upper surface thereof adjacent the forward marginal edge thereof.

A pair of bolt-type hooks 31 are each secured to one of the wing elements 12 intermediate the length of the latter and these hooks project towards each other when the wing elements are positioned in the collapsed or sled forming condition, as best seen in FIG. 3. One end of an elongate chain 32 is secured to one of the hooks 31 and the other end of the chain is secured to a turnbuckle assembly 33. The turnbuckle assembly 33 is also secured to the other of the hooks 31 and serves to releasably hold the wing elements 12 in the collapsed condition. It will be noted, that when the wing elements 12 are in the collapsed or sled forming condition, these wing elements project beyond the transverse stop elements 14 and will engage the snow or ice surface when the backrest member 11 is horizontally oriented.

Opposite ends of an elongate tow rope 34 project through suitable openings formed in the wing elements 12 adjacent the upper ends of the wing element. The ends of the rope may be knotted as at 35 to releasably retain the rope in secured relation to the wing elements.

When the collapsible ice fishing chair is in the erect condition, the seat support members 22 will be swung so that they project forwardly at substantially right angular relation to the backrest member 12. The seat member 17 will be supported upon the seat support members 22 with the front seat element 20 depending downwardly from the seat member 17 and overlying the larger of the seat support members 22. The floor member 25 will be supported upon the support elements 24 of the seat support members 22 and the footrest member 28 will be swung to its forwardly extending position as illustrated in FIG. 1. The wing elements 12 will be swung forwardly to provide side shields for a user seated upon the seat member 17 and the heating medium, such as a lamp L will be ignited to provide warmth for the user. The ice fishing chair thus protects a user against exposure to wind and also is arranged and constructed to provide a compartment for a suitable heating medium. The chair may be erected adjacent an ice fishing hole and will be positioned to give the user maximum protection.

When it is desirable to collapse the ice fishing chair, the heating lamp or other heating medium will be removed from the compartment below the seat member 17 and the backrest member 11 will then be positioned horizontally upon the ice or snow. The seat member 17 will be swung towards that end of the backrest member, which is disposed upwardly when in the erect condition. The front seat element 20 will also be swung upwardly or forwardly to lie upon the front surface of the backrest member. The seat support members which are hinged to the seat member will be swung to the collapsed position, as illustrated in FIG. 3 to lie in superimposed relation upon the seat member. The floor member 25 will be swung upwardly or forwardly to lie upon the front surface 11a of the backrest member and the footrest member 20a will be swung about its hinges 29 to lie in superimposed relation upon the floor member 25. The wing elements 12 will be swung 180° from their forward erect position to engage the end edge surfaces 15 of the transverse stop elements 12 and will be secured in place by the turnbuckle chain assembly. With this arrangement, the free longitudinal edges of the wing elements engage the surface of the ice or snow to serve as runners. It will be noted that the seat member and seat support members are collapsible into a configuration of relatively low or thin profile, as are the floor member and footrest members. The sled can be used to transport fishing gear including the heating lamp, fish and bait and the like. Although the various components of the collapsible ice fishing chair may be formed of any suitable rigid material, it is preferred that the ice fishing chair be formed of wood or the like. When the ice fishing chair is converted to a collapsed sled, the sled may be easily pulled over the surface of the ice by a user.

From the foregoing description, it will be seen that I have provided a novel collapsible ice fishing chair, which when in the erected condition, is arranged and constructed to protect a user against exposure to the wind but provision for suitable heating means below the seat of the collapsible chair. It will also be noted from the preceding description, that the ice fishing chair is readily collapsible to a sled which not only may be easily pulled or towed over the surface of the snow or ice, but also provides a support medium for a user's fishing gear and the like.

Thus, it will be seen that I have provided a novel collapsible ice fishing chair, which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What is claimed is:
1. An ice fishing chair device which is readily collapsible to form a sled, said device comprising,
   an elongate backrest member being vertically oriented and having front and rear surfaces when the device is in the chair defining condition and being horizontally oriented with the front surface disposed upwardly when the device is in the collapsed sled defining condition,
   a seat member hingedly connected with the front surface of said backrest member intermediate the ends of the latter, said seat member being disposed substantially normal to said backrest member when the device is in the chair defining condition and lying upon the front surface of the backrest member when the device is in the collapsed sled defining condition,
   a pair of elongate similar wing members each being hingedly connected with said backrest member and projecting forwardly therefrom at substantially right angular relation thereto when the device is in the chair defining condition, and projecting downwardly from the rear surface of the backrest member at substantially right angular relation thereto to define runners when the device is in the collapsed sled defining condition,
   a pair of seat support members each hingedly connected with said seat member and projecting forwardly at substantially right angular relation with said backrest member and engaging and supporting the seat member when said device is in the chair defining position, said seat support members lying upon the backrest member when the device is in the collapsed sled defining condition,
   a substantially flat floor member hingedly connected with the front surface of said backrest member and spaced below and substantially parallel to said seat member, and extending between and engaging said seat support members when the device is in the erect chair defining condition, said floor member lying upon the front surface of the backrest member when the chair is in the collapsed sled defining condition,
   and a footrest member hingedly connected with said floor member and projecting forwardly beyond the seat support members when the device is in the erect chair defining condition, and lying upon the backrest member when the device is in the collapsed sled defining condition.
2. The ice fishing chair as defined in claim 1 and a plurality of stop elements fixedly connected with said backrest member and projecting rearwardly from the rear surface thereof and engaging said wing members to limit pivoting movement thereof when the device is in the collapsed sled defining condition.

3. The ice fishing chair as defined in claim 1 and releasable locking means on said wing member for releasably holding said wing members in rearwardly right angular projecting relation with respect to said backrest member when the device is in the collapsed sled defining condition.

4. The ice fishing chair as defined in claim 1 and a downturned lip element on the forward marginal portion of said floor member engaging said footrest member to limit pivoting movement thereof and to maintain the footrest member in a forwardly projecting position when the device is in the erect chair defining condition.

5. The ice fishing chair as defined in claim 1 and a pair of support elements each being attached to the inner surface of one of said seat support members adjacent the lower marginal edge portion thereof and engaging the lower surface of said floor member to support the same in forwardly projecting relation with respect to said backrest member when the device is in the chair defining condition.

References Cited

UNITED STATES PATENTS

| | | | |
|---|---|---|---|
| 376,585 | 1/1888 | Crandall | 280—20 |
| 2,062,953 | 12/1938 | Wargo | 280—20 X |
| 2,615,724 | 10/1952 | Lee | 280—20 |
| 2,632,454 | 3/1953 | Skogen | 135—4 |
| 2,754,889 | 7/1956 | Lovelace | 297—1 |

JAMES T. McCALL, *Primary Examiner.*

U.S. Cl. X.R.

280—20; 297—1